US011895576B2

(12) United States Patent
Shimojou et al.

(10) Patent No.: US 11,895,576 B2
(45) Date of Patent: Feb. 6, 2024

(54) COMMUNICATION CONTROL METHOD AND COMMUNICATION SYSTEM

(71) Applicant: NTT DOCOMO, Inc., Tokyo (JP)

(72) Inventors: Takuya Shimojou, Tokyo (JP); Atsushi Minokuchi, Tokyo (JP); Ashiq Khan, Tokyo (JP); Srisakul Thakolsri, Munich (DE); Malla Reddy Sama, Munich (DE); Joan Triay Marques, Munich (DE); Irfan Ali, Istanbul (TR)

(73) Assignee: NTT DOCOMO, INC., Tokyo (JP)

( * ) Notice: Subject to any disclaimer, the term of this patent is extended or adjusted under 35 U.S.C. 154(b) by 206 days.

(21) Appl. No.: 16/499,657

(22) PCT Filed: Apr. 27, 2018

(86) PCT No.: PCT/JP2018/017274
§ 371 (c)(1),
(2) Date: Sep. 30, 2019

(87) PCT Pub. No.: WO2018/207674
PCT Pub. Date: Nov. 15, 2018

(65) Prior Publication Data
US 2020/0045624 A1 Feb. 6, 2020

(30) Foreign Application Priority Data

May 8, 2017 (JP) ................................. 2017-092511

(51) Int. Cl.
*H04W 48/18* (2009.01)
*H04W 48/16* (2009.01)
(Continued)

(52) U.S. Cl.
CPC ........... *H04W 48/18* (2013.01); *H04W 48/16* (2013.01); *H04W 88/14* (2013.01); *H04W 88/18* (2013.01)

(58) Field of Classification Search
None
See application file for complete search history.

(56) References Cited

U.S. PATENT DOCUMENTS

2017/0142591 A1* 5/2017 Vrzic .................... H04W 24/02
2018/0227871 A1* 8/2018 Singh .................... H04W 48/18
(Continued)

OTHER PUBLICATIONS

ZTE, Oracle, ETRI, Telecomm Italia, KDDI: "Proposed architecture alignments of Network Slicing Conclusion with SG Core Overall Architecture in TS 23.501", S2-171027; SA WGs Meeting #119; Dubrovnik, Croatia; 5G_ph1/Rel-15. (Year: 2017).*

(Continued)

*Primary Examiner* — Jeffrey M Rutkowski
*Assistant Examiner* — Mehedi S Aley
(74) *Attorney, Agent, or Firm* — Osha Bergman Watanabe & Burton LLP

(57) ABSTRACT

An NSSF (69) includes: a selection unit selecting a slice corresponding to a service related to a request from a terminal (10) and a target processing server corresponding to the slice based on slice correspondence information including information where a slice, a processing server corresponding to the slice, and a service used by a terminal are associated with one another; and a notification unit notifying an AMF (30) of selection result including information regarding the slice and target processing server. The AMF includes: a determination processing unit determining whether the AMF is a target processing server based on information on the target processing server in the selection result information, and performing processing for a service when the AMF is the target processing server, or transferring a request for processing for a service to the target processing server when the AMF is not the target processing server.

4 Claims, 13 Drawing Sheets

(51) Int. Cl.
*H04W 88/14* (2009.01)
*H04W 88/18* (2009.01)

(56) References Cited

U.S. PATENT DOCUMENTS

| | | | |
|---|---|---|---|
| 2018/0255481 A1* | 9/2018 | Chen | H04W 76/10 |
| 2018/0262979 A1* | 9/2018 | Wang | H04W 24/02 |
| 2018/0368061 A1* | 12/2018 | Yu | H04W 60/00 |
| 2019/0357129 A1* | 11/2019 | Park | H04W 60/04 |
| 2019/0357130 A1* | 11/2019 | Garcia Azorero | H04W 48/18 |
| 2022/0256452 A1* | 8/2022 | Lee | H04W 8/02 |

OTHER PUBLICATIONS

Akihiro Nakao, "Virtual Node Project Virtualization Technology for Building New-Generation Networks", National Institute of Information and Communication Technology, No. 393; Jun. 2010 (7 pages).

International Preliminary Report on Patentability issued in Application No. PCT/JP2018/017274, dated Nov. 21, 2019 (7 pages).

Partial Supplementary European Search Report issued in European Application No. 18799123.7, dated Dec. 16, 2020 (17 pages).

3GPP TSG SA WG5 (Telecom Management) Meeting #112; S5-171978 "Add usecase and requirements for configuring CN with slice specific information" Huawei, China Mobile; Guilin (China); Mar. 27-31, 2017 (6 pages).

SA WG2 Meeting #119; S2-171027 "Network Slicing Architecture Alignment for the Support of Standalone Network Slice Selection Function (NSSF)" ZTE, Oracle, ETRI, Telecom Italia, KDDI; Dubrovnik, Croatia; Feb. 13-17, 2017 (11 pages).

Extended European Search Report issued in counterpart European Patent Application No. 18799123.7, dated Mar. 19, 2021 (14 pages).

Office Action in counterpart Chinese Patent Application No. 201880014467.8 dated May 7, 2021 (21 pages).

ZTE et al.; "Proposed architecture alignments of Network Slicing Conclusion with 5G Core Overall Architecture in TS 23.501"; SA WG2 Meeting #119, S2-171027; Dubrovnik, Croatia; Feb. 13-17, 2017 (9 pages).

Office Action issued in Chinese Application No. 201880014467.8 dated Oct. 20, 2021 (11 pages).

* cited by examiner

| NSI-ID | AMF-ID | SST | SD |
|---|---|---|---|
| 1 | 1 | MBB | X |
| 2 | 2 | V2X | X |

(b)

| AMF-ID | AMF ADDRESS |
|---|---|
| 1 | XX.XX.XX.XX |
| 2 | YY.YY.YY.YY |

| NSI-ID | SST | SD |
|---|---|---|
| 1 | MBB | X |
| 2 | V2X | X |

(b)

| NSI-ID | AMF-ID | AMF ADDRESS |
|---|---|---|
| 1 | 1 | XX.XX.XX.XX |
| 2 | 2 | YY.YY.YY.YY |

| OAM-NSI-ID | CN-NSI-ID | AMF-ID | SST | SD |
|---|---|---|---|---|
| 1 | 1 | 1 | MBB | X |
| 1 | 2 | 2 | V2X | X |

(b)

| OAM-NSI-ID | CN-NSI-ID | SST | SD |
|---|---|---|---|
| 1 | 1 | MBB | X |
| 1 | 2 | V2X | X |

(c)

| OAM-NSI-ID | CN-NSI-ID | AMF-ID | AMF ADDRESS |
|---|---|---|---|
| 1 | 1 | 1 | XX.XX.XX.XX |
| 1 | 2 | 2 | YY.YY.YY.YY |

COMMUNICATION CONTROL METHOD AND COMMUNICATION SYSTEM

TECHNICAL FIELD

The present invention relates to a communication control method and a communication system. More specifically, the present invention relates to a communication control method executed by a communication system including a slice selection device that selects a slice serving as a virtual network logically generated in a network infrastructure and a plurality of processing servers that are associated with one or more slices, and the communication system.

BACKGROUND ART

Network systems using a virtualization technology in the related art generate network slices (which will hereinafter be abbreviated to "slices") serving as virtual networks logically generated in a network infrastructure, by virtually dividing a hardware resource using the virtualization technology disclosed in Non-Patent Literature 1. Then, a service is allocated for the slices, so that a service can be provided using networks of independent slices. Accordingly, when individually allocating slices for services having various request conditions, it is possible to easily satisfy the request conditions of each of the services and to reduce signaling processing and the like thereof.

CITATION LIST

Non-Patent Literature

Non-Patent Literature 1: Akihiro NAKAO, Virtual Node Project, Virtualization Technology for Building New-Generation Networks, [online], June, 2010, National Institute of Information and Communications Technology (independent administrative institution), [searched for on Mar. 16, 2015], Internet <http://www.nict.go.jp/publication/NICT-News/1006/01.html>

SUMMARY OF INVENTION

Technical Problem

When there is a service request from a terminal to a base station in a network system as described above, the base station transfers the service request to a processing server (corresponding to a so-called access and mobility management function (AMF)) of which a session is set at the point of time thereof or a default processing server which has been set in advance. However, in order to smoothly execute processing thereafter, it is desirable that an appropriate processing server which manages a slice corresponding to a service request from a terminal should be selected and processing should be performed.

However, currently, technologies for selecting an appropriate processing server from a plurality of processing servers in a network system have not yet been sufficiently developed.

The present invention has been made in order to solve the foregoing problem, and an object thereof is to select an appropriate processing server suitable for a service request from a terminal.

Solution to Problem

According to an embodiment of the present invention, there is provided a communication control method executed by a communication system including a slice selection device that retains slice correspondence information including information in which a slice serving as a virtual network logically generated in a network infrastructure, a processing server corresponding to the slice, and a service to be used by a terminal are associated with one another and selects a slice based on the slice correspondence information; and a plurality of processing servers that execute processing related to the terminal while each processing server of the plurality of processing servers is associated with one or more slices. The communication control method includes: a step in which one processing server having received a request for use of a service from the terminal transfers the request for use to the slice selection device; a step in which the slice selection device selects a slice corresponding to a service related to the request for use and a target processing server corresponding to the slice based on the slice correspondence information and notifies the one processing server of selection result information including information related to the slice and the target processing server which have been selected; and a step in which the one processing server determines whether or not the one processing server is the target processing server based on the information related to the target processing server included in the selection result information, and responsive to a determination that the one processing server is the target processing server, the one processing server performs processing for a service related to the request for use, and responsive to a determination that the one processing server is not the target processing server, the one processing server transfers a request for processing for a service related to the request for use, to the target processing server.

According to the communication control method of the foregoing embodiment, when one processing server having received a request for use of a service from a terminal transfers the request for use to the slice selection device, the slice selection device selects a slice corresponding to a service related to the request for use and a target processing server corresponding to the slice based on the slice correspondence information including the information in which a slice, a processing server corresponding to the slice, and a service to be used by a terminal are associated with one another and notifies the one processing server of the selection result information including the information related to the slice and the target processing server which have been selected. Then, the one processing server determines whether or not the one processing server is the target processing server based on the information related to the target processing server included in the selection result information, and responsive to a determination that the one processing server is the target processing server, the one processing server performs processing for a service related to the request for use, and responsive to a determination that the one processing server is not the target processing server, the one processing server transfers a request for processing for a service related to the request for use, to the target processing server. In this manner, the slice selection device selects a slice corresponding to a service related to a request for use and a target processing server corresponding to the slice (that is, an appropriate processing server suitable for a service request from a terminal) based on the slice correspondence information including the information in which a slice, a processing server corresponding to the slice, and a service to be used by a terminal are associated with one another, and processing for a service related to the request for use from the terminal is performed by the selected target processing server.

In addition, according to another embodiment of the present invention, there is provided a communication control method executed by a communication system including a slice selection device that retains slice correspondence information including information in which a slice serving as a virtual network logically generated in a network infrastructure and a service to be used by a terminal communicating with a processing server corresponding to the slice are associated with each other and selects a slice based on the slice correspondence information, and a plurality of processing servers that execute processing related to the terminal while each processing server of the plurality of processing servers is associated with one or more slices.

The communication control method includes a step in which one processing server having received a request for use of a service from the terminal transfers the request for use to the slice selection device; a step in which the slice selection device selects a slice corresponding to a service related to the request for use based on the slice correspondence information and notifies the one processing server of information of the selected slice; and a step in which the one processing server selects a target processing server corresponding to the selected slice based on processing server correspondence information including information in which a slice and a processing server corresponding to the slice are associated with each other, and responsive to a selection result that the one processing server is the target processing server, the one processing server performs processing for a service related to the request for use, or responsive to a selection result that the one processing server is not the target processing server, the one processing server transfers a request for processing for a service related to the request for use, to the target processing server.

According to the communication control method of the foregoing embodiment, when one processing server having received a request for use of a service from a terminal transfers the request for use to the slice selection device, the slice selection device selects a slice corresponding to a service related to the request for use based on the slice correspondence information including the information in which a slice and a service to be used by a terminal communicating with a processing server corresponding to the slice are associated with each other and notifies the one processing server of the information of the selected slice. Then, the one processing server selects a target processing server corresponding to the selected slice based on the processing server correspondence information including the information in which a slice and a processing server corresponding to the slice are associated with each other, and responsive to a selection result that the one processing server is the target processing server, the one processing server performs processing for a service related to the request for use, and responsive to a selection result that the one processing server is not the target processing server, the one processing server transfers a request for processing for a service related to the request for use, to the target processing server. In this manner, one processing server selects a target processing server (that is, an appropriate processing server suitable for a service request from a terminal) corresponding to the selected slice based on the processing server correspondence information including the information in which a slice and a processing server corresponding to the slice are associated with each other, and processing for a service related to a request for use from the terminal is performed by the selected target processing server.

Advantageous Effects of Invention

According to the present invention, it is possible to select an appropriate processing server suitable for a service request from a terminal.

BRIEF DESCRIPTION OF DRAWINGS

FIG. 4(a) is a view illustrating an example of a slice management table according to the first embodiment, and FIG. 4(b) is a view illustrating an example of an AMF management table according to the first embodiment.

FIG. 5(a) is a view illustrating an example of a slice management table according to the second embodiment, and FIG. 5(b) is a view illustrating an example of a slice-AMF correspondence information according to the second embodiment.

FIG. 10(a) is a view illustrating a modification example of the slice management table according to the first embodiment, FIG. 10(b) is a view illustrating a modification example of the slice management table according to the second embodiment, and FIG. 10(c) is a view illustrating a modification example of the slice-AMF correspondence information according to the second embodiment.

DESCRIPTION OF EMBODIMENTS

Hereinafter, various embodiments of the present invention will be described with reference to the drawings. A first embodiment is an embodiment in which a slice selection device (network slice selection function (which will hereinafter be referred to as "an NSSF" in the embodiments of the invention)) selects an appropriate processing server (access and mobility management function (which will hereinafter be referred to as "an AMF" in the embodiments of the invention)) in a so-called next generation network (NGN). A second embodiment is an embodiment in which an AMF itself selects an appropriate AMF in the next generation network. In description of the drawings, the same reference signs are applied to the same elements, and duplicated description will be omitted.

First Embodiment

Configuration of System of First Embodiment

Figure 1:
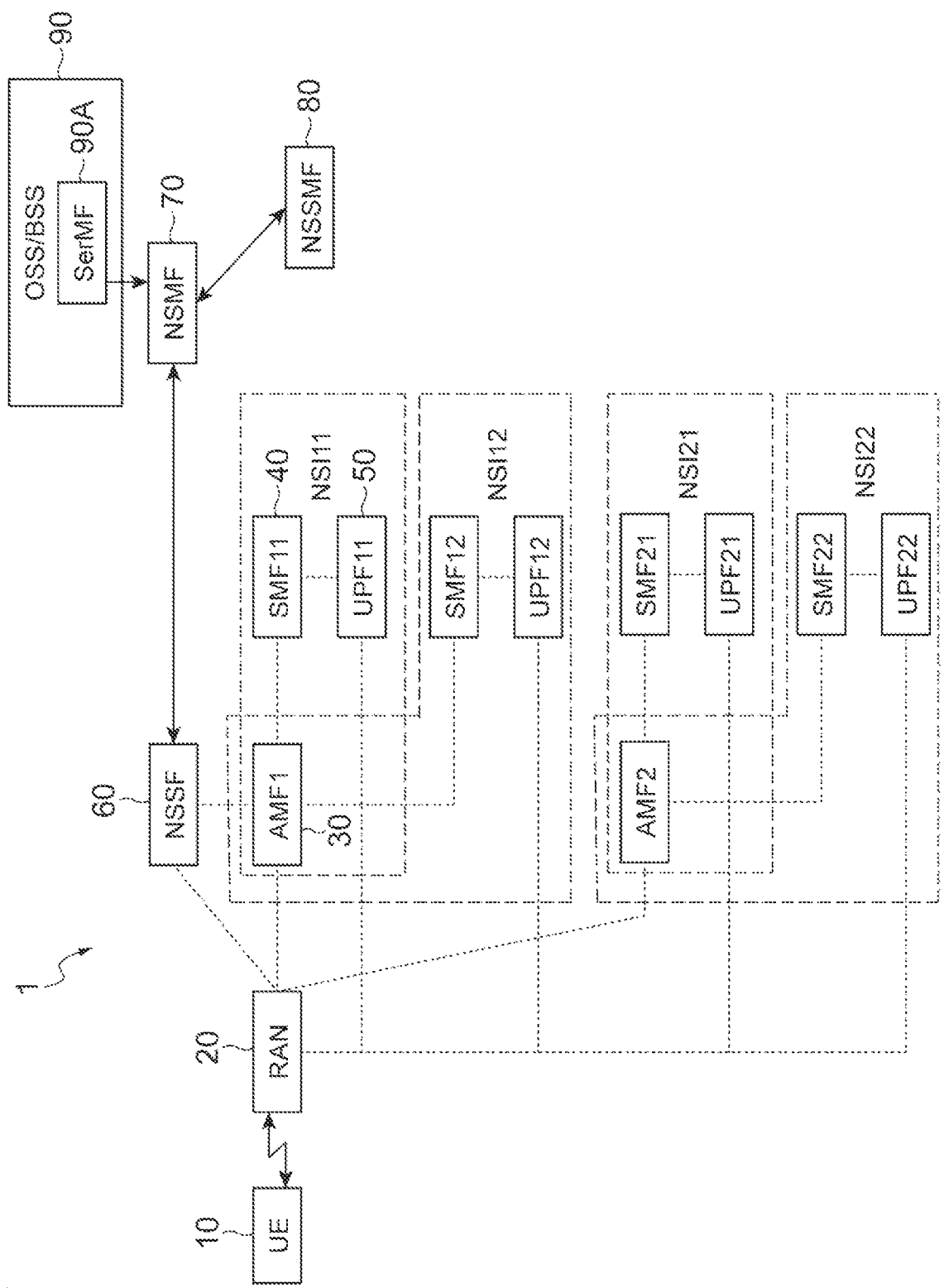
FIG. 1 is a view illustrating an example of a configuration of a communication system according to first and second embodiments.

As illustrated in FIG. 1, a communication system 1 according to the first embodiment is configured to include a terminal (UE) 10, a radio access network (which will hereinafter be referred to as "a RAN") 20 including an eNodeB corresponding to a base station, a plurality of access and mobility management functions (AMFs) 30, a plurality of session management function (SMFs) 40, a plurality of user plane functions (UPFs) 50, a network slice selection function (NSSF) 60, network slice management functions (NSMFs) 70, and a network slice sub-network management function (NSSMF) 80. Hereinafter, an overview of each of the devices will be described.

The AMF 30 is a device having a function of performing access management, mobility management, and the like of the UE 10 present in a network. The SMF 40 is a device having a function of managing a U-plane session. The UPF 50 is a device having a function of processing U-plane traffic. A slice serving as a virtual network logically generated in a network infrastructure is configured to include the AMF 30, the SMF 40 and the UPF 50, and an aggregation of nodes and circuit lines configuring a slice will be referred to as a network slice instance (NSI). One AMF can be shared by a plurality of slices. For example, in the example of the configuration in FIG. 1, an NSI 11 is configured to include an AMF 1, an SMF 11, and a UPF 11. An NSI 12 is configured to include the AMF 1, an SMF 12, and a UPF 12. The AMF 1 is shared by a slice related to the NSI 11 and a slice related to the NSI 12. Similarly, an NSI 21 is configured to include an AMF 2, an SMF 21, and a UPF 21. An NSI 22 is configured to include the AMF 2, an SMF 22, and a UPF 22. The AMF 2 is shared by a slice related to the NSI 21 and a slice related to the NSI 22.

The NSSF 60 is a device having a function of selecting a slice. The NSMF 70 is a device having a function of generating and managing a slice. The NSSMF 80 is a device having a function of generating and managing a part of a slice (network slice sub-network). Among these, the NSMF 70 generates and manages a slice related to a service to be provided, in cooperation with a service management function (SerMF) 90A included in an operation support system/business support system (OSS/BSS) 90 that is a system through which a service provider realizes and provides a service.

Among those above, the NSSF 60 and the AMF 30 include the following functional units related to the present invention.

Figure 2:
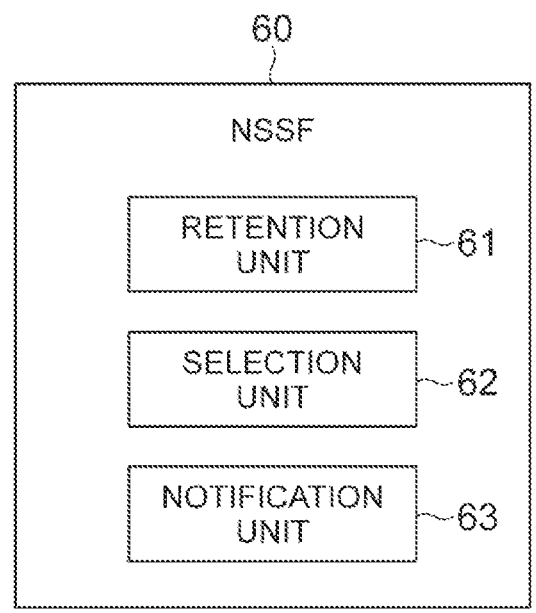
FIG. 2 is a view of a configuration of a functional block of a slice selection device (NSSF).

As illustrated in FIG. 2, the NSSF 60 includes a retention unit 61 that retains a slice management table (corresponding to "slice correspondence information" in the claims) including information in which a slice, an AMF corresponding to the slice, and a service to be used by a UE are associated with one another; a selection unit 62 that selects a slice corresponding to a service related to a request for use from a UE and an AMF corresponding to the slice (corresponding to "a target processing server" in the claims) based on the slice management table; and a notification unit 63 that notifies an AMF of selection result information including information related to a selected slice and a selected AMF (which will hereinafter be referred to as "a target AMF").

Figure 3:
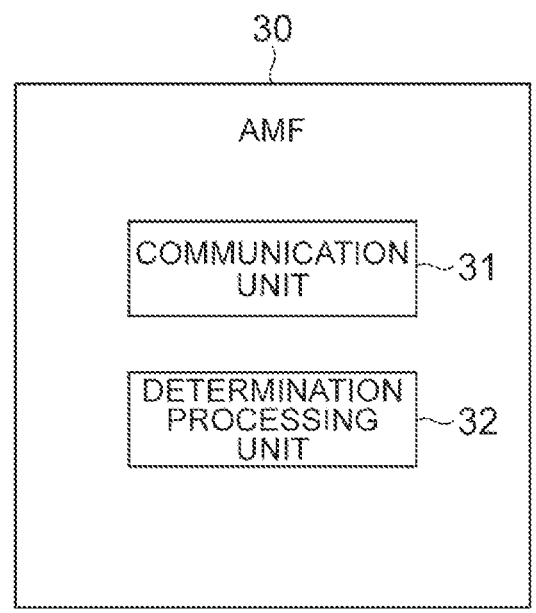
FIG. 3 is a view of a configuration of a functional block of a processing server (AMF).

As illustrated in FIG. 3, the AMF 30 includes a communication unit 31 that receives a request for use of a service from a UE and transfers the request for use to the NSSF 60; and a determination processing unit 32 that determines whether or not the AMF is the target AMF based on information related to the selected target AMF in the selection result information notified from the NSSF, and responsive to a determination that the AMF is the target AMF, the AMF performs processing for a service related to the request for use, and responsive to a determination that the AMF is not the target AMF, the AMF transfers a request for processing for a service related to the request for use, to the target AMF.

As illustrated in FIG. 4(a), in the slice management table retained in the retention unit 61, for example, identification information of NSIs (NSI-IDs) related to slices; identification information of AMFs (AMF-IDs) corresponding to the slices; slice service types (SSTs) which are one of parameters used when selecting a slice and which define a service request condition, a service type, and the like; and slice differentiators (SDs) which are one of parameters used when selecting a slice and which stipulate information other than a service (for example, terminal information and corporate information) are stored in association with one another.

The determination processing unit 32 retains an AMF management table illustrated in FIG. 4(b), in which the identification information of AMFs (AMF-IDs) and addresses of the AMFs are stored in association with each other. When the AMF is not the target AMF, the determination processing unit 32 acquires address information of the target AMF with reference to the AMF management table and transfers a request for processing for a service to the target AMF using the address information.

Description of Processing According to First Embodiment

Hereinafter, regarding processing according to the first embodiment, slice management table updating processing for an NSSF (FIG. 6) and slice connection processing for a UE (FIG. 7) will be described.

Figure 6:
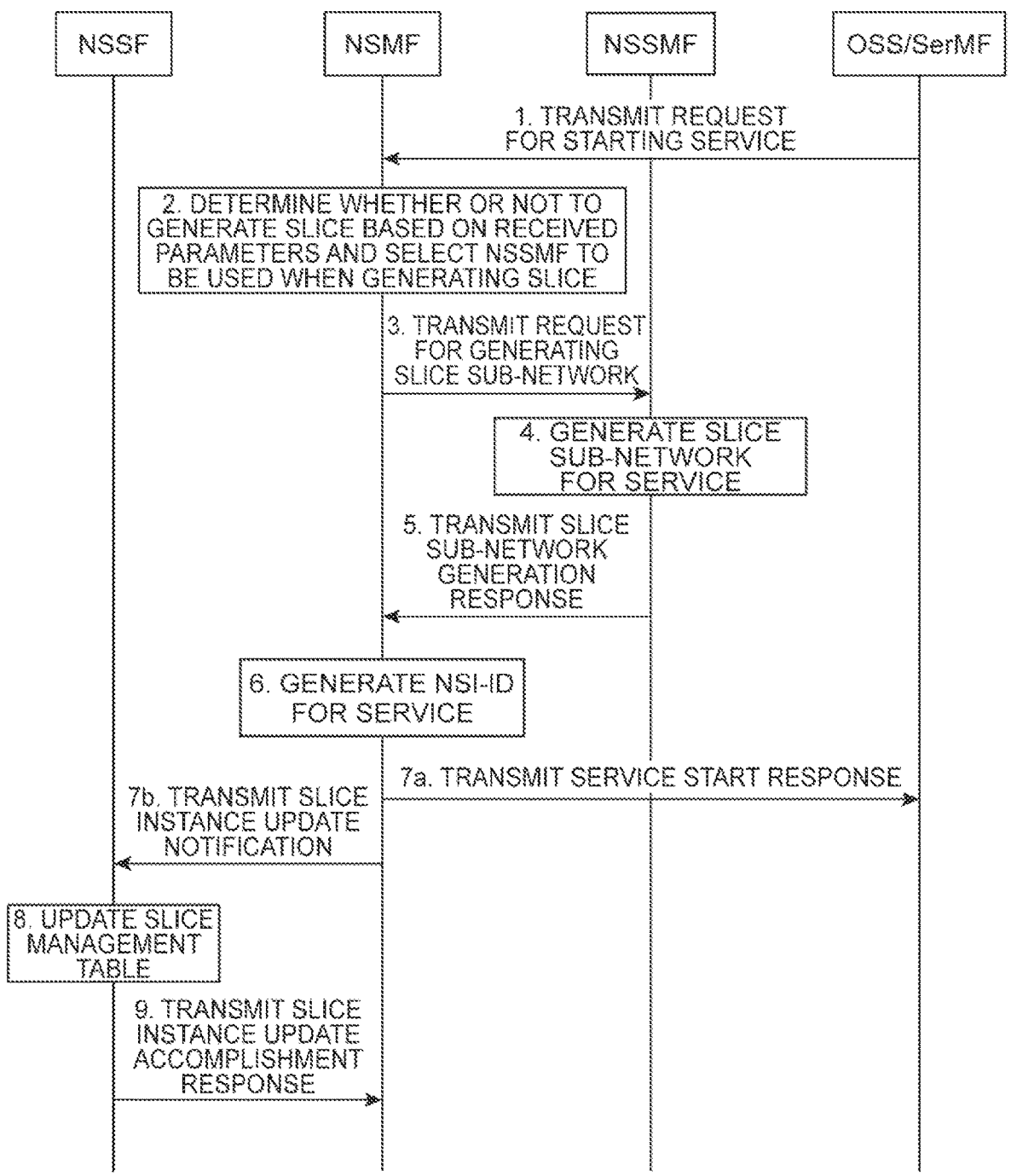
FIG. 6 is a sequence diagram illustrating slice management table updating processing of the NSSF according to the first and second embodiments.

The slice management table updating processing for an NSSF illustrated in FIG. 6 is processing for updating the slice management table retained in the retention unit 61 in FIG. 2 to latest information based on an instruction from the NSMF. For example, starting of the processing in FIG. 6 is triggered by a request for starting a service transmitted from the SerMF included in the OSS/BSS to the NSMF (Step 1 in FIG. 6). For example, the foregoing request for starting a service includes an SST, an SD, and information related to the service request condition described above.

When a request for starting a service is received, the NSMF determines whether or not to generate a slice based on the parameters such as the SST and the SD included in the request for starting a service. When it determines to generate a slice, an NSSMF used for generating a slice is selected (Step 2 in FIG. 6). Here, it is determined whether or not a slice corresponding to the service type defined by the SST, the information other than a service (for example, terminal information and corporate information) stipulated by the SD, and the information related to the service request condition are present in an available state. If no such slice is present, it is determined that a slice is generated. In such a case, an NSSMF suitable for generating a slice corresponding to the SST, the SD, and the like is selected. When the SST, the SD, and the like are not included in a request for starting a service from the SerMF, the NSMF may autonomously set the SST, the SD, and the like using a predetermined technique.

In a case of generating a slice, when the NSMF transmits a request for generating a slice sub-network to the NSSMF selected in Step 2 (Step 3 in FIG. 6), the NSSMF generates a slice sub-network for a service related to the request for starting a service (Step 4 in FIG. 6) and transmits a slice sub-network generation response indicating that this has been generated normally to the NSMF (Step 5 in FIG. 6). Then, the NSMF generates an NSI-ID related to the slice for a service related to the request for starting a service (Step 6 in FIG. 6). The NSMF transmits a service start response indicating that the processing related to the request for starting a service in Step 1 has been completed to the SerMF (Step 7*a* in FIG. 6) and transmits a slice instance update notification to the NSSF (Step 7*b* in FIG. 6). For example, a slice instance update notification includes information of the generated NSI-ID, the SST, and the SD. Regarding the processing order, either of Step 7*a* or 7*b* may be performed in advance, or both may be simultaneously performed. Then, the NSSF identifies the AMF which manages a slice related to the NSI-ID included in a slice instance update notification, based on management information retained in advance. The NSSF updates the slice management table using the AMF-ID of the identified AMF and the information of the NSI-ID, the SST, and the SD included in the slice instance update notification (Step 8 in FIG. 6) and transmits a slice instance update accomplishment response indicating that the update has been completed to the NSMF (Step 9 in FIG. 6).

When a slice is generated through the processing in FIG. 6 as described above, the slice management table retained in the NSSF is normally updated based on an instruction from the NSMF. In FIG. 6, attention has been paid to a case in which a slice is newly generated. However, throughout all of the cases in which the information related to a slice is updated, such as a case in which a change occurs in the NSI related to a slice, and a case in which an existing slice is deleted, processing similar to that in FIG. 6 is executed, and the slice management table retained in the NSSF is updated based on an instruction from the NSMF.

Figure 7:
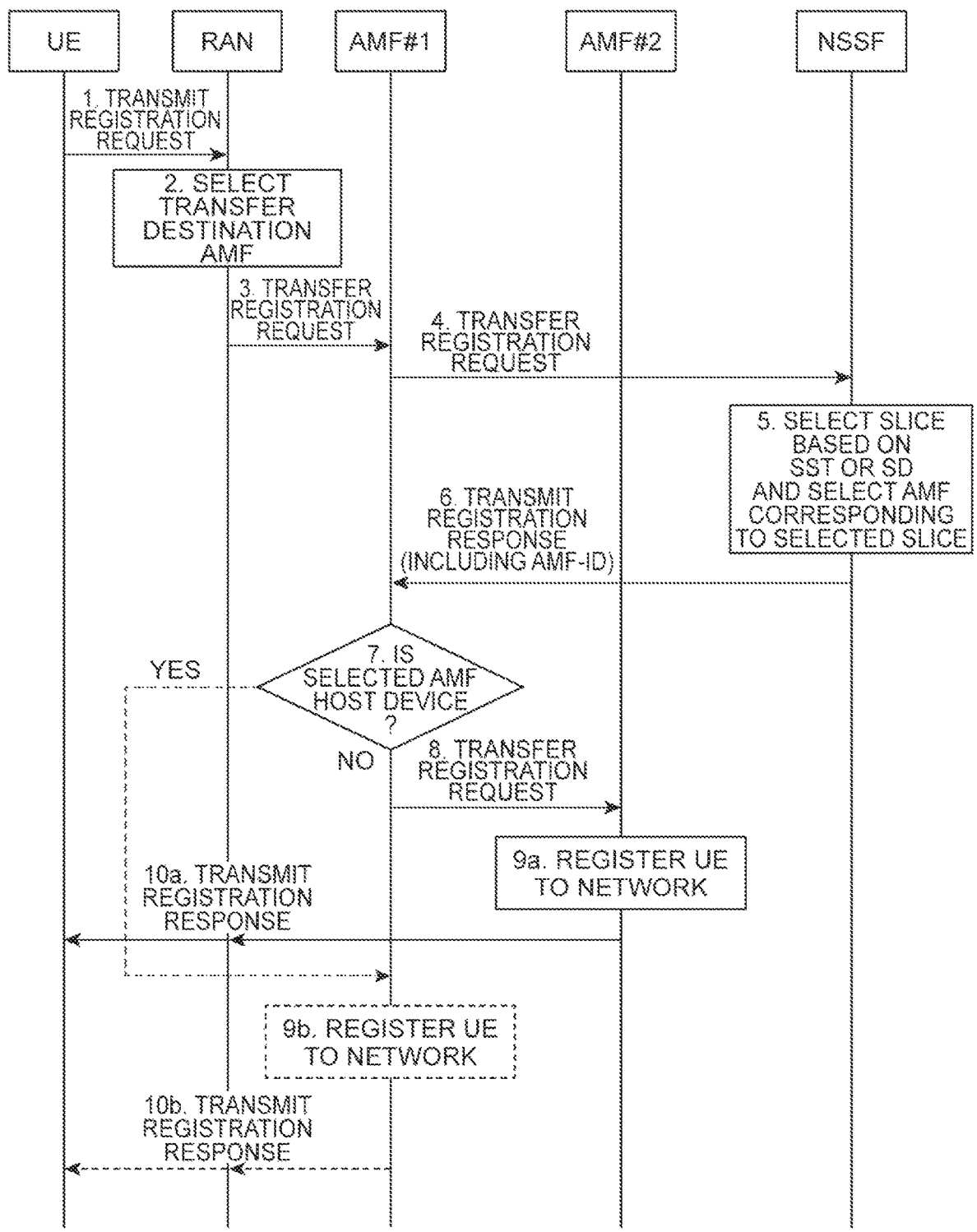
FIG. 7 is a sequence diagram illustrating the slice connection processing for a terminal according to the first embodiment.

The slice connection processing for a UE illustrated in FIG. 7 is processing executed when triggered by a network registration request (which will hereinafter be referred to as "a registration request") which includes information of a service desired to be used and is transmitted from a UE (Step 1 in FIG. 7). Through this processing, an appropriate slice related to a service desired to be used by the UE and an appropriate AMF corresponding to the slice are selected.

A RAN such as an eNB that has received a registration request from a UE selects an AMF of which a session is set at the point of time thereof or a default AMF (here, an AMF #1) which has been set in advance, as a transfer destination AMF (Step 2 in FIG. 7) and transfers a registration request to the selected AMF #1 (Step 3 in FIG. 7). Then, the AMF #1 which has received a registration request transfers the registration request to the NSSF (Step 4 in FIG. 7).

Here, the NSSF selects a slice related to the SST or the SD corresponding to the service based on the information of a service and the slice management table included in the registration request and selects an AMF (target AMF) corresponding to the slice selected based on the AMF-ID in the slice management table (Step 5 in FIG. 7). Then, the NSSF transmits a registration response including the AMF-ID of the selected target AMF to the AMF #1 (Step 6 in FIG. 7). In this case, the NSSF transmits a registration response including information of a service (for example, information including the SST, the SD, and the like) certifying that the selected slice is approved to be used by the UE, and the NSI-ID corresponding to the selected slice, in addition to the AMF-ID.

Next, the AMF #1 determines whether or not the selected AMF (target AMF) is the host device (AMF #1 itself) with reference to the AMF-ID in the received registration response (Step 7 in FIG. 7). Here, when the target AMF is not the host device (AMF #1 itself), the AMF #1 acquires the address information of the target AMF (here, an AMF #2) with reference to an AMF management table in FIG. 4(*b*) and transfers a registration response to the AMF #2 (Step 8 in FIG. 7). The AMF #2 executes registration processing for the UE for a network using the information in the received registration response (Step 9*a* in FIG. 7) and transmits a registration response indicating that the registration processing has been completed normally to the UE via the RAN (Step 10*a* in FIG. 7).

On the other hand, when the selected AMF (target AMF) is the host device (AMF #1 itself) in Step 7 of FIG. 7, the AMF #1 executes registration processing for the UE for a network using the information in the received registration response (Step 9*b* in FIG. 7) and transmits a registration response indicating that the registration processing has been completed normally to the UE via the RAN (Step 10*b* in FIG. 7).

Through the processing in FIG. 7 described above, the NSSF can select a slice corresponding to a service related to a request for use and an AMF corresponding to the slice (that is, an appropriate AMF suitable for the request for use from the UE), so that processing for a service is suitably executed by the selected AMF.

In the first embodiment, a form in which an AMF retains the AMF management table in FIG. 4(*b*) has been described. However, the AMF management table may be retained in a node (for example, a domain name system (DNS) server) within a network, and an AMF may acquire the address information of the target AMF (that is, the selected AMF) corresponding to the AMF-ID by querying the node.

Second Embodiment

In the second embodiment, an embodiment in which an AMF itself selects an appropriate AMF in the next generation network will be described. The configuration of a system in the second embodiment is similar to the configuration of the communication system 1 according to the first embodiment illustrated in FIG. 1. Therefore, here, duplicated description will be omitted. However, since the function of each unit of the NSSF 60 in FIG. 2 related to the present invention and the function of each unit of the AMF 30 in FIG. 3 are different from those in the first embodiment, they will be described below.

The NSSF 60 of the second embodiment includes the retention unit 61 that retains the slice management table (corresponding to "the slice correspondence information" in the claims) including information in which a slice and a service to be used by a UE communicating with an AMF corresponding to the slice are associated with each other, the selection unit 62 that selects a slice corresponding to a service related to a request for use from a UE based on the slice management table, and the notification unit 63 that notifies the AMF 30 of information of the selected slice.

The AMF 30 of the second embodiment includes the communication unit 31 that receives a request for use of a service from a UE and transfers the request for use to the NSSF 60; and the determination processing unit 32 that selects an AMF corresponding to the slice notified from the NSSF 60 (which will hereinafter be referred to as "a target AMF") based on slice-AMF correspondence information in FIG. 5(*b*) (which will be described below) including information in which a slice and an AMF corresponding to the slice are associated with each other. Responsive to a selection result that the AMF is the target AMF, the determination processing unit 32 performs processing for a service related to the request for use, and responsive to a selection result that the AMF is not the target AMF, the determination processing unit 32 transfers a request for processing for a service related to the request for use, to the target AMF.

As illustrated in FIG. 5(*a*), in the slice management table of the second embodiment, for example, identification information of NSIs (NSI-IDs) related to slices; slice service types (SSTs) which are one of parameters used when selecting a slice and which define a service request condition, a service type, and the like; and slice differentiators (SDs) which are one of parameters used when selecting a slice and which stipulate information other than a service (for example, terminal information and corporate information) are stored in association with one another. The slice management table of the second embodiment is different from that of the first embodiment, and it is not essential to include the identification information of AMFs (AMF-IDs) which manage a slice.

In the slice-AMF correspondence information illustrated in FIG. 5(*b*), for example, the identification information of NSIs (NSI-IDs) related to a slice, the identification information of AMFs (AMF-IDs) corresponding to the slice, and the address of the AMF are stored in association with one another. The determination processing unit 32 uses the slice-AMF correspondence information to select a target AMF corresponding to the selected slice and also uses it to acquire the address information of the target AMF when a request for processing for a service is transferred to the target AMF.

Description of Processing According to Second Embodiment

Hereinafter, regarding processing according to the second embodiment, slice connection processing for a UE (FIG. 8) will be described. The slice management table updating processing for an NSSF of the second embodiment is similar to the slice management table updating processing for an NSSF of the first embodiment described based on FIG. 6. Therefore, here, duplicated description will be omitted.

Figure 8:
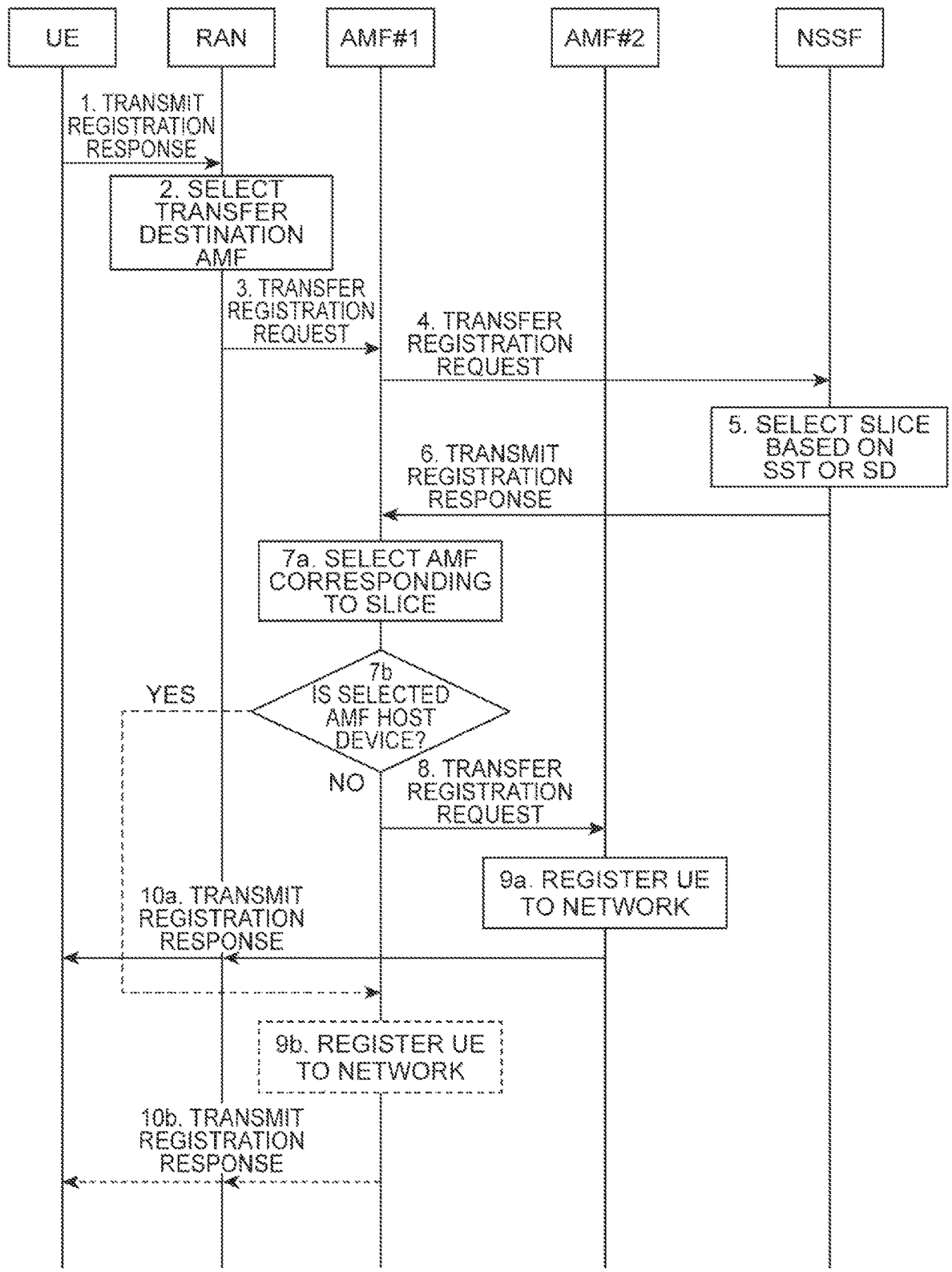
FIG. 8 is a sequence diagram illustrating the slice connection processing for a terminal according to the second embodiment.

The slice connection processing for a UE illustrated in FIG. 8 is processing executed when triggered by a registration request (network registration request) which includes information of a service desired to be used and is transmitted from a UE (Step 1 in FIG. 8). Through this processing, an appropriate slice related to a service desired to be used by the UE and an appropriate AMF corresponding to the slice are selected.

A RAN such as an eNB that has received a registration request from a UE selects an AMF of which a session is set at the point of time thereof or a default AMF (here, the AMF #1) which has been set in advance, as a transfer destination AMF (Step 2 in FIG. 8) and transfers a registration request to the selected AMF #1 (Step 3 in FIG. 8). Then, the AMF #1 which has received a registration request transfers the registration request to the NSSF (Step 4 in FIG. 8).

Here, the NSSF selects a slice related to the SST or the SD corresponding to the service based on the information of a service and the slice management table included in the registration request (Step 5 in FIG. 8). Then, the NSSF transmits, to the AMF #1, a registration response including information of a service (for example, information including the SST, the SD, and the like) certifying that the selected slice is approved to be used by the UE, and the NSI-ID corresponding to the selected slice (Step 6 in FIG. 8).

Next, the AMF #1 selects an AMF (target AMF) corresponding to a slice related to the NSI-ID in the received registration response with reference to the slice-AMF correspondence information in FIG. 5(*b*) (Step 7*a* in FIG. 8) and determines whether or not the selected AMF (target AMF) is the host device (AMF #1 itself) (Step 7*b* in FIG. 8). Here, when the target AMF is not the host device (AMF #1 itself), the AMF #1 acquires the address information of the target AMF (here, the AMF #2) with reference to the slice-AMF correspondence information in FIG. 5(*b*) and transfers a registration response to the AMF #2 (Step 8 in FIG. 8). The AMF #2 executes registration processing for the UE for a network using the information in the received registration response (Step 9*a* in FIG. 8) and transmits a registration response indicating that the registration processing has been completed normally to the UE via the RAN (Step 10*a* in FIG. 8).

On the other hand, when the target AMF is the host device (AMF #1 itself) in Step 7*b* of FIG. 8, the AMF #1 executes registration processing for the UE for a network using the information in the received registration response (Step 9*b* in FIG. 8) and transmits a registration response indicating that the registration processing has been completed normally to the UE via the RAN (Step 10*b* in FIG. 8).

Through the processing in FIG. 8 described above, the NSSF transmits, to the AMF #1, a registration response including information of a service certifying that the selected slice is approved to be used by the UE, and the NSI-ID corresponding to the selected slice. The AMF #1 can select an AMF (that is, an appropriate AMF suitable for a request for use from the UE) corresponding to a slice related to the NSI-ID in the received registration response with reference to the slice-AMF correspondence information. Thereafter, processing for a service can be suitably executed by the selected AMF (target AMF).

In the second embodiment, a form in which an AMF retains the slice-AMF correspondence information in FIG. 5(*b*) has been described. However, in the slice-AMF correspondence information of FIG. 5(*b*), the AMF may retain only correspondence information of the NSI-ID and the AMF-ID, and a node within a network (for example, a DNS server) retains correspondence information of the AMF-ID and the AMF address. The AMF may acquire the address information of the target AMF by querying the node regarding the address information of the AMF (selected target AMF) corresponding to the AMF-ID.

Modification Example 1

There may be cases of managing a slice in which a plurality of service providers or network providers (OSS/BSS) (which will hereinafter be abbreviated to "a service provider") are present in the same physical network. On the assumption of such a case, it is desirable that the slice management table managed by the NSSF and the NSMF include, as the NSI-ID, information for identifying the service provider corresponding to the slice.

Specifically, FIG. 10(*a*) illustrates a modification example of the slice management table managed by the NSSF and the NSMF according to the first embodiment. As illustrated in FIG. 10(*a*), in the slice management table, the NSI-ID may be configured to include a core network NSI-ID (CN-NSI-ID) for identifying a slice itself and an operation and management NSI-ID (OAM-NSI-ID) for identifying a service provider. In addition, regarding the slice management table managed by the NSSF and the NSMF according to the second embodiment as well, as illustrated in FIG. 10(b), the NSI-ID may be configured to include the CN-NSI-ID and the OAM-NSI-ID. Moreover, regarding the slice-AMF correspondence information managed by the AMF according to the second embodiment as well, as illustrated in FIG. 10(c), the NSI-ID may be configured to include the CN-NSI-ID and the OAM-NSI-ID. In the foregoing case, regarding the same slice, the identification information (OAM-NSI-ID) can be divided for each service provider. Therefore, even in a case of managing a slice in which a plurality of service providers are present in the same physical network, slice management can be smoothly executed.

Modification Example 2

Figure 11:
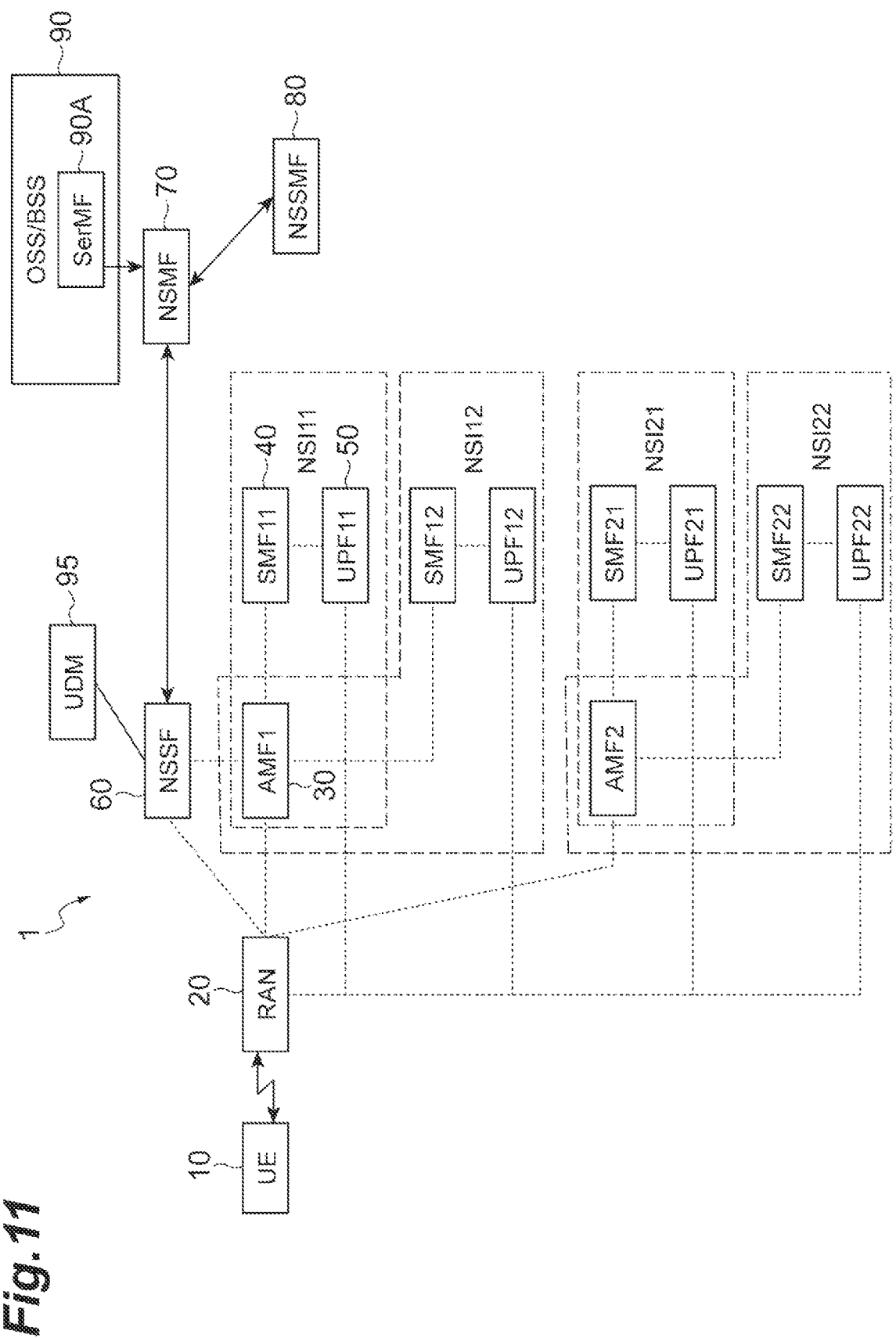
FIG. 11 is a view illustrating an example of a configuration of a communication system according to a modification example 2.

As illustrated in FIG. 11, in a communication system according to a modification example 2, a user data manager (which will hereinafter be referred to as "a UDM")) 95 which manages information related to a terminal user is present. The NSSF 60 can communicate with the UDM 95. In addition, the AMF 30 can communicate with the UDM 95 via the NSSF 60.

Figure 12:
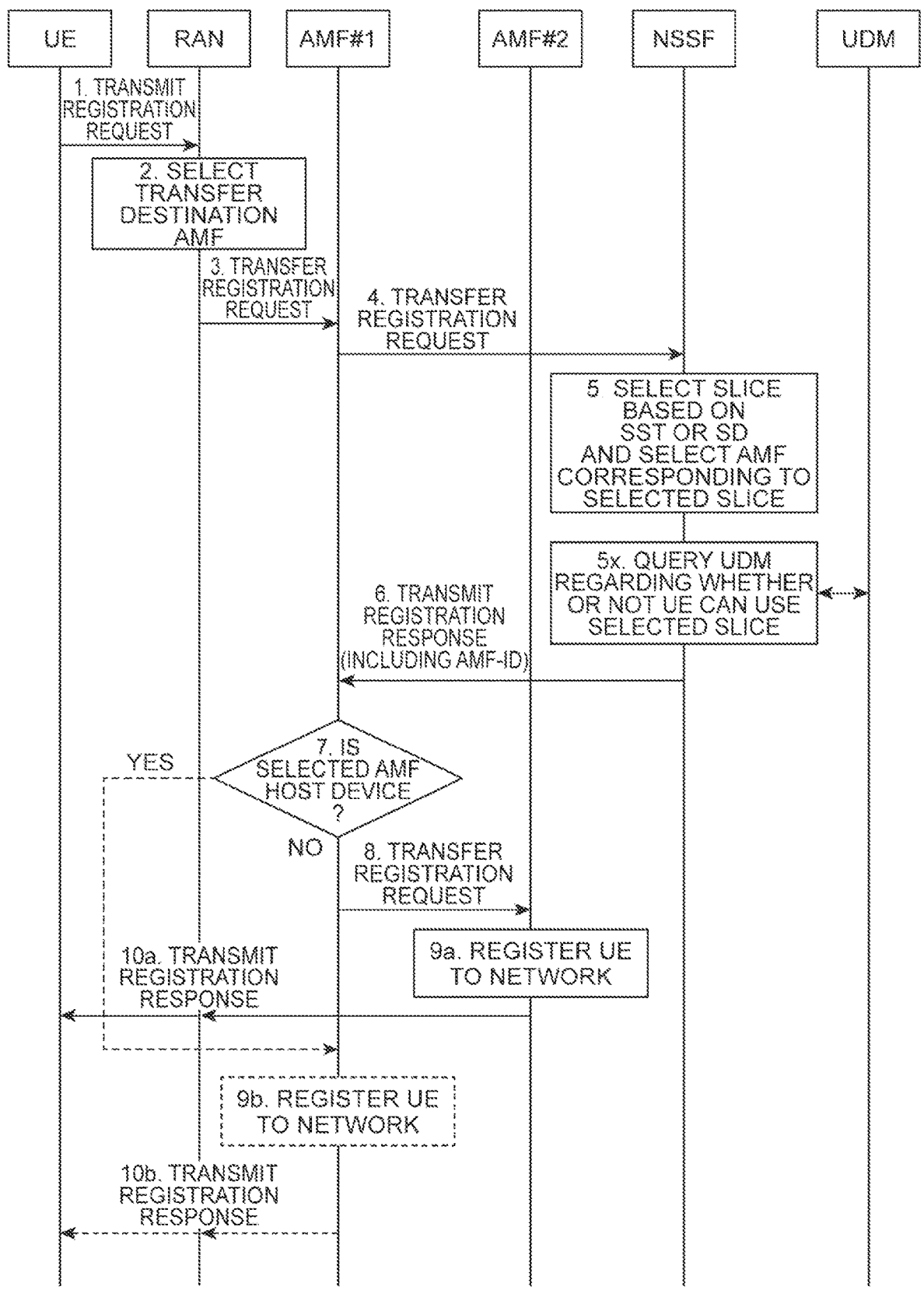
FIG. 12 is a sequence diagram illustrating a case in which the modification example 2 is applied to processing in FIG. 7.

In the modification example 2, the NSSF or the AMF can query the UDM regarding whether or not a UE can use the selected slice. For example, as illustrated in FIG. 12, in the processing of the first embodiment (FIG. 7), after the NSSF has selected a slice and an AMF in Step 5, the NSSF may query the UDM regarding whether or not a UE can use the selected slice, in Step 5x. In addition, in place of Step 5x in FIG. 12, immediately before Step 7, the AMF #1 may query the UDM regarding whether or not a UE can use a slice selected by the NSSF.

Figure 13:
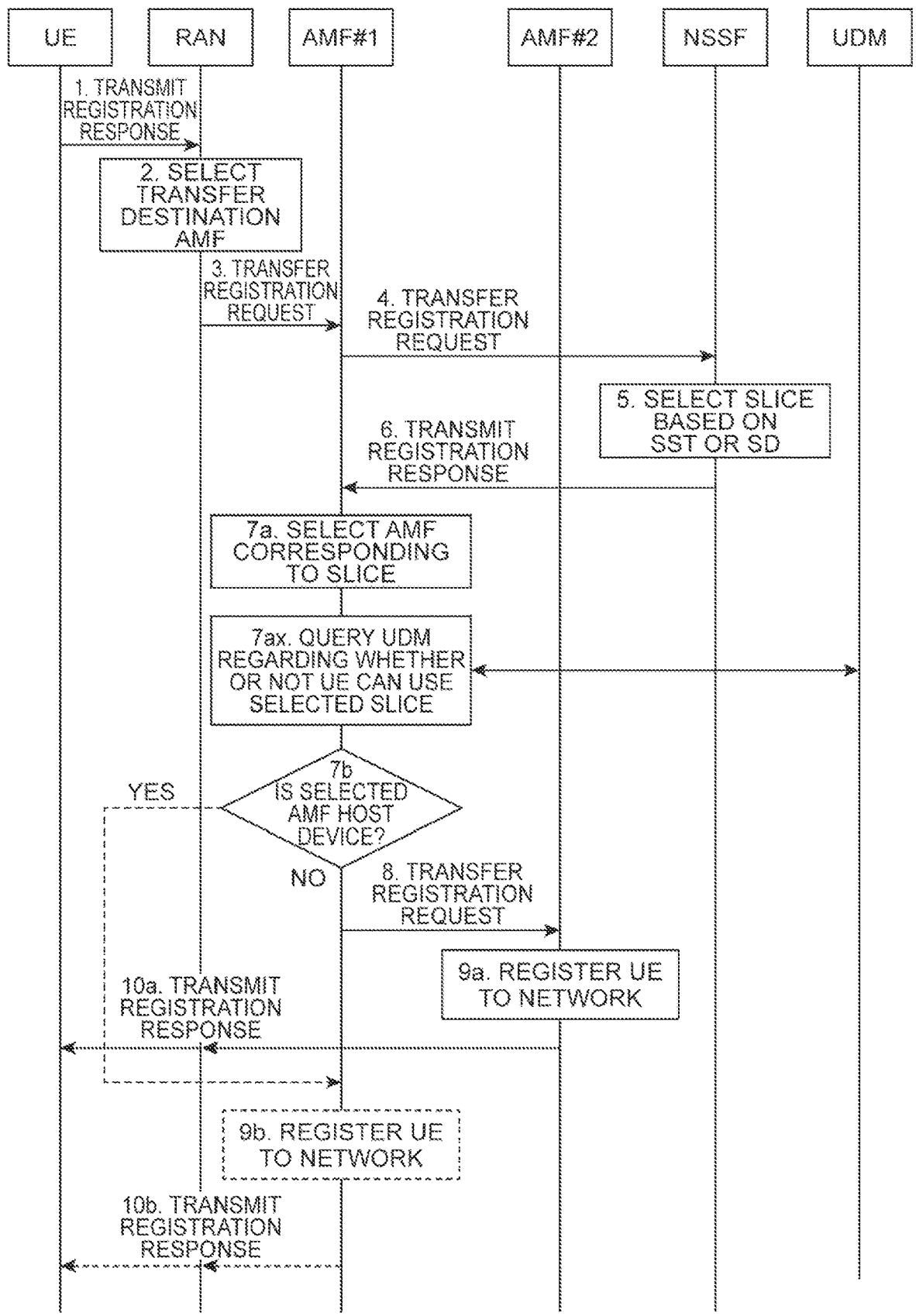
FIG. 13 is a sequence diagram illustrating a case in which the modification example 2 is applied to processing in FIG. 8.

Similarly, as illustrated in FIG. 13, in the processing of the second embodiment (FIG. 8), after Step 7a, the AMF #1 may query the UDM regarding whether or not a UE can use a slice selected by the NSSF, in Step 7ax. In addition, in place of Step 7ax in FIG. 13, immediately after Step 5, the NSSF may query the UDM regarding whether or not a UE can use the selected slice. Through the modification example 2 as described above, it is possible to check in advance that a UE can use the selected slice. Therefore, it is possible to avoid a disadvantage such as a service used by an inappropriate UE and to improve reliability of the system in its entirety.

The block diagram used in description of the foregoing embodiment illustrates blocks in the units of functions. These functional blocks (configuration units) are realized by an arbitrary combination of hardware and/or software. In addition, means for realizing each of the functional blocks is not particularly limited. That is, each of the functional blocks may be realized by one device which is coupled physically and/or logically or may be realized by a plurality of devices by directly and/or indirectly (for example, by cable and/or wirelessly) connecting two or more devices which are separated from each other physically and/or logically.

Figure 9:
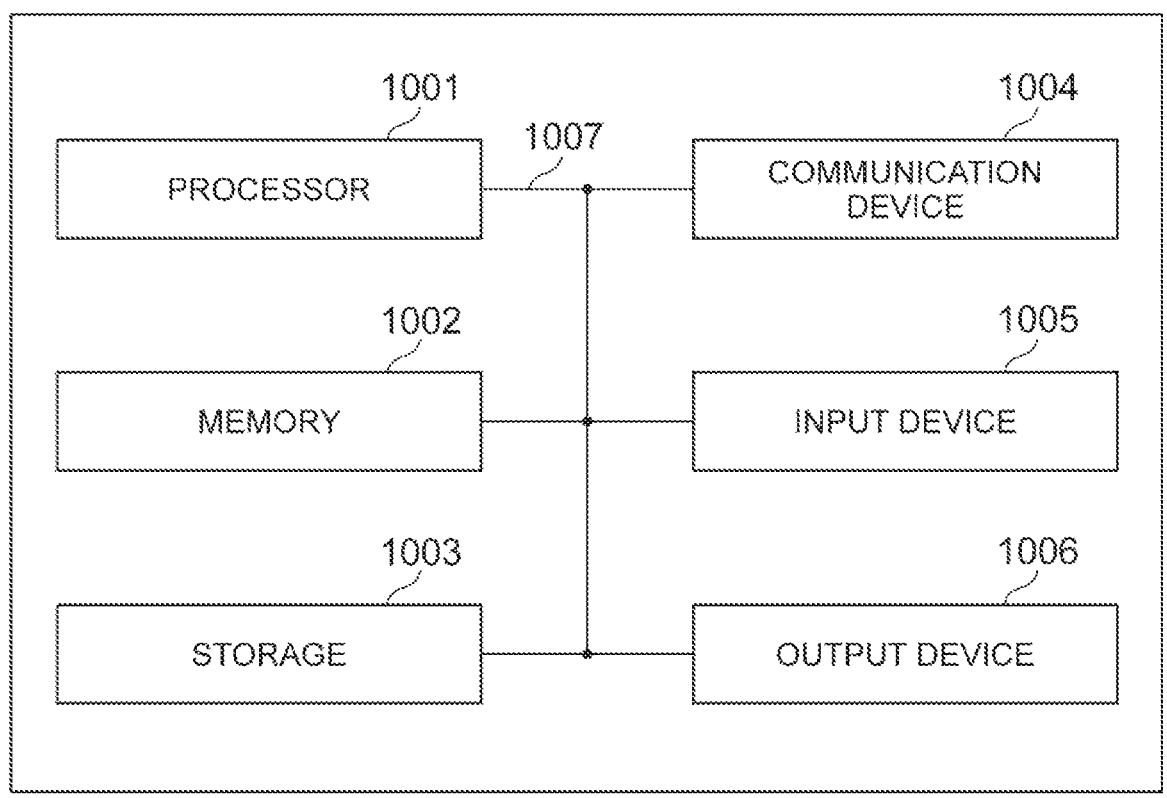
FIG. 9 is a view illustrating an example of a configuration of hardware of each of the devices.

For example, each of the devices (for example, the NSSF 60 and the AMF 30) in FIG. 1 in the foregoing embodiment may function as a computer executing the processing described above. FIG. 9 is a view illustrating an example of a configuration of hardware of each of the devices. Each of the devices may be physically constituted as a computer device including a processor 1001, a memory 1002, a storage 1003, a communication device 1004, an input device 1005, an output device 1006, a bus 1007, and the like.

In the following description, the term a "device" can be reworded as a circuit, a device, a unit, or the like. Regarding the configuration of the hardware in FIG. 9, it may be configured to include one or a plurality of the devices illustrated in FIG. 9, or may be configured not to include a part of the devices.

Each of the functions in each of the devices in FIG. 1 is realized by causing hardware such as the processor 1001 and the memory 1002 to read predetermined software (program) such that the processor 1001 performs computation, and controlling communication of the communication device 1004 and reading and/or writing of data in the memory 1002 and the storage 1003.

For example, the processor 1001 controls the entire computer by operating an operating system. The processor 1001 may be constituted of a central processing unit (CPU) including interfaces with respect to peripheral devices, a control device, a computation device, a register, and the like. For example, each of the functional units of the management device 60 may be realized while including the processor 1001.

In addition, the processor 1001 reads out a program (program code), a software module, data, and the like from the storage 1003 and/or the communication device 1004 to the memory 1002, thereby executing various kinds of processing in accordance therewith. Regarding a program, a program for causing a computer to execute at least a part of the operations described in the foregoing embodiment is used. For example, each of the functional units of each of the devices may be realized by a control program which is stored in the memory 1002 and is operated by the processor 1001, and other functional blocks may also be realized in a similar manner. Description has been given based on the circumstances in which various kinds of processing described above are executed by one processor 1001. However, various kinds of processing may be executed simultaneously or sequentially by two or more processors 1001. The processor 1001 may be mounted in one or more chips. A program may be transmitted from a network via an electric communication line.

The memory 1002 is a computer readable recording medium. For example, the memory 1002 may be constituted of at least one of a read only memory (ROM), an erasable programmable ROM (EPROM), an electrically erasable programmable ROM (EEPROM), and a random access memory (RAM). The memory 1002 may be referred to as a register, a cache, a main memory (main storage device), or the like. The memory 1002 can retain a program (program code), which can be executed to perform the method according to the embodiment of the present invention, a software module, and the like.

The storage 1003 is a computer readable recording medium. For example, the storage 1003 may be constituted of at least one of an optical disc such as a compact disc ROM (CD-ROM), a hard disk drive, a flexible disk, a magneto-optical disc (for example, a compact disc, a digital versatile disc, or a Blu-ray (registered trademark) disc), a smart card, a flash memory (for example, a card, a stick, or a key drive), a Floppy (registered trademark) disk, and a magnetic strip. The storage 1003 may be referred to as an auxiliary storage device. For example, the storage medium described above may be database including the memory 1002 and/or the storage 1003, a server, or other suitable mediums.

The communication device 1004 is hardware (transceiver) for performing communication between computers via cable and/or wireless networks. For example, the communication device 1004 may also be referred to as a network device, a network controller, a network card, and a communication module. For example, each of the functional units of each of the devices may be realized while including the communication device 1004.

The input device 1005 is an input device for receiving an input from the outside (for example, a keyboard, a mouse, a microphone, a switch, a button, or a sensor). The output device 1006 is an output device for performing an output to the outside (for example, a display, a speaker, and an LED lamp). The input device 1005 and the output device 1006 may be configured to be integrated (for example, a touch panel).

In addition, devices such as the processor 1001 and the memory 1002 are connected to each other through the bus 1007 for performing communication of information. The bus 1007 may be constituted of a single bus or may be constituted of buses differing between devices.

In addition, each of the devices in FIG. 1 may be configured to include hardware such as a microprocessor, a digital signal processor (DSP), an application specific integrated circuit (ASIC), a programmable logic device (PLD), and a field programmable gate array (FPGA). A part or all of the functional blocks may be realized by these pieces of hardware. For example, the processor 1001 may be mounted in at least one of these pieces of hardware. Devices other than the management device 60 illustrated in FIG. 1 may have a configuration similar to that of the foregoing communication terminal.

Hereinabove, the present embodiment has been described in detail. It will be apparent to those skilled in the art that the present embodiment is not limited to the embodiment described in this specification. The present embodiment can be implemented as amended and changed forms without departing from the gist and the scope of the present invention defined by the disclosed claims. Therefore, this specification is disclosed for the purpose of describing an example and has no limited meaning with respect to the present embodiment.

In the processing procedure, the sequence, the flowchart, and the like of each of the forms and the embodiment described in this specification, the order may be rearranged as long as there is no contradiction. For example, regarding the method described in this specification, elements of various steps are presented in an exemplary order, and the method is not limited to a particular order which has been presented.

Information or the like which has been input and output may be retained in a particular place (for example, a memory), or may be managed by a management table. Information or the like to be input and output can be overwritten, updated, or added. Output information or the like may be deleted. Input information or the like may be transmitted to other devices.

Judging may be performed based on a value expressed by one bit (either 0 or 1), may be performed based on a Boolean value (true or false), or may be performed based on comparison between numeric values (for example, comparison with a predetermined value).

Each of the forms and the embodiment described in this specification may be adopted independently, may be adopted in a combination, or may be adopted to be switched in accordance with execution. In addition, notification of predetermined information (for example, notification of "being X") is not limited to that performed explicitly and may be performed implicitly (for example, notification of the predetermined information is not performed).

Regardless of the name, such as software, firmware, middleware, a microcode, and a hardware description language, or under other names, software has to be widely interpreted to indicate an instruction, an instruction set, a code, a code segment, a program code, a program, a subprogram, a software module, an application, a software application, a software package, a routine, a subroutine, an object, an executable file, an execution thread, a procedure, a function, and the like.

In addition, software, an instruction, and the like may be transmitted and received via a transmission medium. For example, when software is transmitted from a web site, a server, or other remote sources using a cable communication technology, such as a coaxial cable, an optical fiber cable, a twisted-pair wire, and a digital subscriber line (DSL) and/or a radio communication technology such as infrared rays, radiowaves, and microwaves, the cable communication technology and/or the radio communication technology is included within the definition of a transmission medium.

Information, a signal, and the like described in this specification may be expressed by using any of various different technologies. For example, data, an instruction, a command information, a signal, a bit, a symbol, and a chip which have been mentioned throughout the entire description above may be expressed by a voltage, a current, electromagnetic waves, a magnetic field or magnetic particles, an optical field or photons, or an arbitrary combination thereof.

In addition, information, parameters, and the like described in this specification may be expressed by an absolute value, may be expressed by a relative value derived from a predetermined value, or may be expressed by different corresponding information.

There are cases in which a mobile communication terminal is referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms by those skilled in the art.

The expression "based on" used in this specification does not mean "based on only", unless otherwise specified. In other words, the expression "based on" means both "based on only" and "based on at least".

As long as the terms "include", "including", and a deformation thereof are used in this specification or the claims, these terms are intended to be comprehensive similar to the term "comprising". Moreover, the term "or" used in this specification or the claims is intended not to be exclusive OR.

In this specification, a plurality of devices are also included, except for the case in which obviously only one device is present contextually or technologically. The present disclosure in its entirety includes elements in a plural form unless it is obviously indicated to be in a singular form contextually.

REFERENCE SIGNS LIST

1: communication system, 10: UE (terminal), 20: RAN, 30: AMF (processing server), 31: communication unit, 32: determination processing unit, 40: SMF, 50: UPF, 60: NSSF (slice selection device), 61: retention unit, 62: selection unit, 63: notification unit, 70: NSMF (slice management device), 80: NSSMF, 90: OSS/BSS, 90A: SerMF, 95: UDM, 1001: processor, 1002: memory, 1003: storage, 1004: communication device, 1005: input device, 1006: output device, 1007: bus.

The invention claimed is:

1. A communication control method executed by a communication system including: a slice selection device that retains slice correspondence information including information in which a slice serving as a virtual network logically generated in a network infrastructure, a processing server corresponding to the slice, and a service to be used by a terminal are associated with one another and selects a slice based on the slice correspondence information, and a plurality of processing servers that execute processing related to the terminal while each processing server of the plurality of processing servers is associated with one or more slices, the communication control method comprising:

a step in which one processing server having received a request for use of a service from the terminal transfers the request for use to the slice selection device;

a step in which the slice selection device selects a slice corresponding to a service related to the request for use and a target processing server corresponding to the slice based on the slice correspondence information and notifies the one processing server of selection result information including information related to the slice and the target processing server which have been selected;

a step in which the one processing server determines whether or not the one processing server is the target processing server based on the information related to the target processing server included in the selection result information notified from the slice selection device, wherein, in response to a determination that the one processing server is the target processing server selected by the slice selection device, the one processing server performs processing for a service related to the request for use, and wherein, in response to a determination that the one processing server is not the target processing server selected by the slice selection device, the one processing server transfers a request for processing for a service related to the request for use, to the target processing server; and a step in which the slice selection device or the one processing server sends a query to a user data manager which manages information related to a terminal user regarding whether or not the terminal is capable of using the selected slice.

2. The communication control method according to claim 1, wherein the communication system includes a slice management device that generates and manages a slice for a service provided by the communication system, wherein the communication control method further comprises:

a step in which the slice selection device updates the slice correspondence information to latest information based on an instruction for updating the slice correspondence information from the slice management device.

3. The communication control method according to claim 1, wherein the slice correspondence information includes information for identifying a service provider corresponding to the slice, as information for identifying the slice to be associated with.

4. A communication system comprising:

a slice selection device that selects a slice serving as a virtual network logically generated in a network infrastructure; and a plurality of processing servers that execute processing related to a terminal while each processing server of the plurality of processing servers is associated with one or more slices, wherein the slice selection device includes a memory that retains slice correspondence information including information in which the slice, a processing server corresponding to the slice, and a service to be used by a terminal are associated with one another, a slice selection processor that selects a slice corresponding to a service related to a request for use from the terminal and a target processing server corresponding to the slice based on the slice correspondence information, and a transmitter that notifies the processing server of selection result information including information related to the slice and the target processing server which have been selected, wherein the processing server includes a transceiver that receives a request for use of a service from the terminal and transfers the request for use to the slice selection device, and a server processor that determines whether or not the processing server is the target processing server based on the information related to the target processing server included in the selection result information notified from the slice selection device, wherein, in response to a determination that the one processing server is the target processing server selected by the slice selection device, the one processing server performs processing for a service related to the request for use, and wherein, in response to a determination that the one processing server is not the target processing server selected by the slice selection device, the one processing server transfers a request for processing for a service related to the request for use, to the target processing server, and wherein the slice selection processor or the server processor sends a query to a user data manager which manages information related to a terminal user regarding whether or not the terminal is capable of using the selected slice.

* * * * *